Sept. 1, 1931.  C. G. STRANDLUND  1,821,774
ROLLING COLTER
Filed Nov. 21, 1927
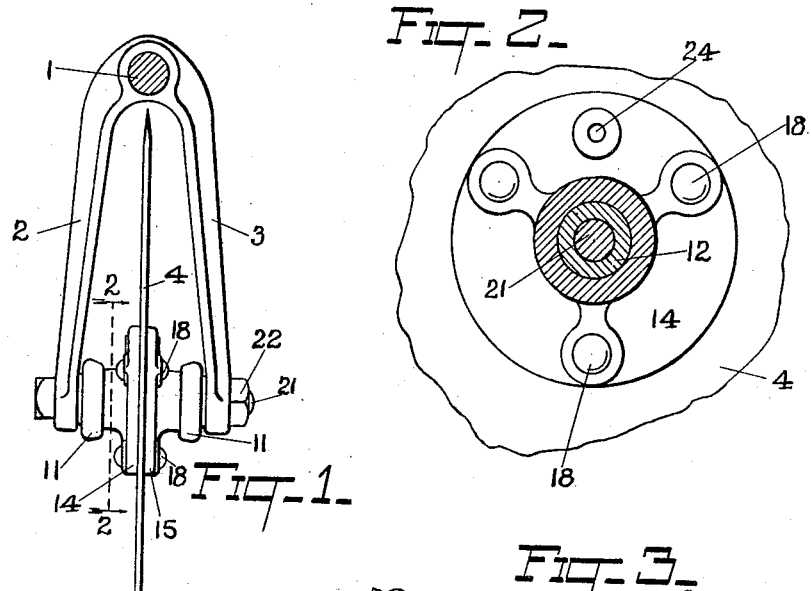
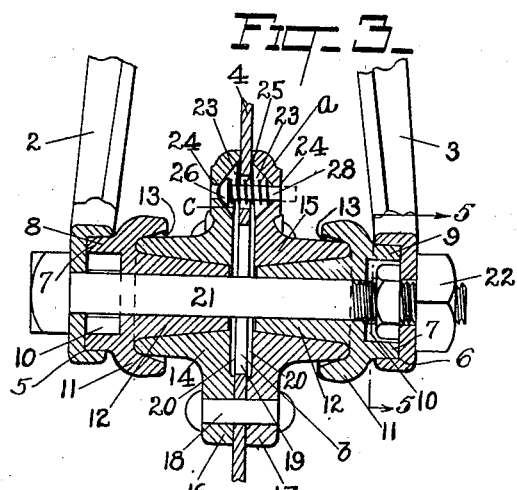
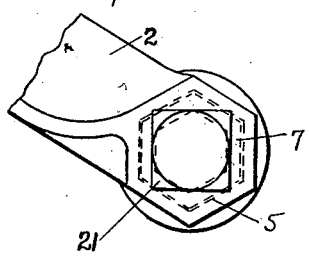
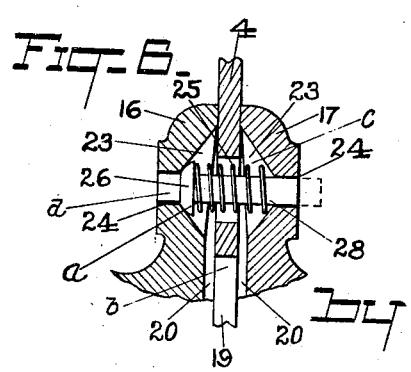
Inventor
Carl G. Strandlund
by W. C. Johnston
Attorney
Witness
A. D. McLay Patented Sept. 1, 1931

1,821,774

UNITED STATES PATENT OFFICE

CARL G. STRANDLUND, OF MOLINE, ILLINOIS, ASSIGNOR TO DEERE & COMPANY, OF MOLINE, ILLINOIS, A CORPORATION OF ILLINOIS

ROLLING COLTER

Application filed November 21, 1927. Serial No. 234,735.

My invention relates to rotary colters, and more particularly to the lubrication of the parts thereof, and the object of my invention is to provide an orifice in a part of the hub of a colter through which a lubricant can be readily supplied and which is normally closed to prevent admission of dust or grit.

Referring to the drawings in which similar numerals indicate identical parts:

Fig. 1 is a plan view of my colter and its support in which my invention is embodied;

Fig. 2 is an enlarged fragmentary sectional detail of the colter and its hub taken on the line 2—2 of Fig. 1;

Fig. 3 is an enlarged transverse detail section of Fig. 1;

Fig. 4 is a side view of an end of the colter support;

Fig. 5 is a detail section on the line 5—5 of Fig. 3, and

Fig. 6 is a modification of my device.

The type of colter support shown consists of a yoke mounted on a spindle 1, and at the extremity of the legs 2 and 3 of the yoke the colter 4 is rotatably carried. On the inner sides of the legs 2 and 3 respectively, at the ends thereof, are hexagonal recesses 5 and 6, adapted to receive hexagonal ends 7 of bearing members 8 and 9, said ends having hexagonal recesses 10. The members 8 and 9 have circular enlargements 11 and frustum-conical parts 12 and between the enlargements 11 and the parts 12 are annular recesses 13.

The hub to which the colter 4 is secured is composed of two parts 14 and 15 having flanges 16 and 17 between which the colter 4 is securely held by rivets 18. The hub is rotatably journaled on the frustum-conical parts 12 of the members 8 and 9, and the ends thereof are fitted in the recess 13 in the bearing members 11. The colter 4 has a central circular opening 19 and coincident therewith, in each of the opposed faces of the hub parts 14 and 15, are recesses 20 providing, with the opening 19, a chamber $b$ to hold a lubricant. The several parts described are held together by a bolt 21 passed through orifices in the ends of the legs 2 and 3, the members 8 and 9, and the opening 19 in the colter 4, the head of the bolt 21 contacting with the outer surface of the end of the leg 2; the opposite end of the bolt extending beyond the leg 3 and threaded to receive a nut 22 by operation of which the parts described are held firmly together.

I provide a receiving chamber $c$ for oil or grease by countersinking recesses 23 in the opposed faces of the parts 14 and 15 of the hub. The recesses 23 are, preferably, conical, and from the apex of each a straight bore 24 extends through the parts 14 and 15 and in alinement therewith is an orifice 25 in the colter 4. The receiving chamber $c$ opens into the holding chamber $b$ so that oil or grease fed into the receiving chamber $c$ will spread into the holding chamber $b$ and penetrate between the hub parts 14 and the stationary parts 12. It is necessary to prevent entrance of soil to the receiving and holding chambers, and to that end I provide a stopper 26, which operates within the receiving chamber, and is preferably rivet shaped. The head 27 of the stopper is semi-circular and fits snugly against the bore 24 in the part 14 of the hub. The stem 28 of the stopper extends through the orifice 25, in the colter 4, and into the bore 24 in the part 15 of the hub. A coiled spring $a$ around the stem of the stopper, exerts its expansive force between the head of the stopper and the wall of the receiving chamber to hold the head of the stopper in normal position to close the bore against which it rests, and so prevent admission of dust or sand. In Fig. 6, I illustrate a modified form of the stopper in which the stem 28 is continued beyond the head 27 as at $a$, to fill the bore 24 in the part 14 of the hub. By supporting the stopper in the wall or walls of the receiving chamber the stopper is retained in true alinement with the bore 24.

In the above description, I have disclosed a rolling colter provided with improved facilities for lubricating the operating parts including a chamber to hold an ample supply of lubricating material receivable through a connecting chamber having an external aperture, and provided with an automatically operating stopper to exclude sand or dust. This stopper 26 is longitudinally movable against the spring $a$ to open the chamber $c$, by pressure from the nozzle of an oil can or grease gun applied to the head of the stopper, or to the stem extension $d$ as in Fig. 6, and after the desired quantity of oil or grease has been deposited and the pressure removed, the stopper 26 is returned to its normal position, as shown in the drawings, by action of the spring $a$, and the receiving chamber is closed firmly against admission of material liable to be injurious to the mechanism, the closure also preventing leakage of the lubricant. If however the stopper should not move readily, at any time, under ordinary pressure to give access to the receiving chamber or if it fails for any reason to close the aperture, then a slight tap of a hammer will be sufficient to restore its efficiency.

What I claim is—

In a rolling colter, the combination of a two part hub, recesses in the opposed faces of said parts, a colter blade rigidly secured between the hub parts and having a central opening conforming to said recesses to provide a holding chamber for lubricating material, opposed recesses in the hub parts beyond the limit of the holding chamber to form a receiving chamber, an opening connecting said chambers, alined openings extending exteriorly from the receiving chamber, an opening in the colter blade within the receiving chamber, a stopper supported in one of the openings in the receiving chamber longitudinally movable therein and projecting through the opening in the colter blade, a head on said stopper normally operating to close the adjacent opening in the receiving chamber, and a coiled spring on said stopper acting expansively thereon through the opening in the colter blade to hold the stopper in normal position.

CARL G. STRANDLUND.